United States Patent [19]
Gabura

[11] Patent Number: 5,110,212
[45] Date of Patent: May 5, 1992

[54] SMOOTHNESS SENSOR

[75] Inventor: Andrew J. Gabura, Ontario, Canada

[73] Assignee: Sentrol Systems, Ltd., Canada

[21] Appl. No.: 914,673

[22] Filed: Oct. 2, 1986

[51] Int. Cl.$^5$ .................................. G01N 21/47
[52] U.S. Cl. .................................. 356/429; 356/446
[58] Field of Search ............ 356/446, 429, 430, 371, 356/337; 250/571

[56] References Cited

U.S. PATENT DOCUMENTS

| | | | |
|---|---|---|---|
| 3,453,053 | 7/1969 | Gunn-Russell | 356/430 |
| 3,693,021 | 9/1972 | Lake, Jr. et al. | 356/430 |
| 3,806,256 | 4/1974 | Ishak | 356/446 |
| 4,092,068 | 5/1978 | Lucas et al. | 356/446 |
| 4,252,443 | 2/1981 | Lucas et al. | 356/430 |
| 4,423,331 | 12/1983 | Koizumi et al. | 356/446 |
| 4,464,050 | 8/1984 | Kato et al. | 356/446 |
| 4,582,429 | 4/1986 | Callaghan | 356/350 |
| 4,598,997 | 7/1986 | Steigmeier | 356/446 |

FOREIGN PATENT DOCUMENTS

| | | | |
|---|---|---|---|
| 894570 | 4/1962 | United Kingdom | 356/430 |
| 2025041 | 6/1979 | United Kingdom | 356/371 |

*Primary Examiner*—Richard A. Rosenberger
*Attorney, Agent, or Firm*—Shenier & O'Connor

[57] ABSTRACT

A system for providing a measure of the smoothness of a moving web in which light from a source is focused on a spot on the moving web. Light from an arc of substantially 360° around the optical axis is collected and light from 120° sectors of the collected light is reflected to three detectors the outputs of which are processed to provide the smoothness measure.

11 Claims, 2 Drawing Sheets

SMOOTHNESS SENSOR

FIELD OF THE INVENTION

The invention is in the field of instruments for measuring the smoothness of a moving web and, more specifically, the invention relates to an optical smoothness sensor which is more sensitive than are smoothness sensors of the prior art.

BACKGROUND OF THE INVENTION

There are known in the prior art various instruments for affording a measure of the smoothness of a moving web such, for example, as a web of paper or the like. Some of these instruments are laboratory or offline instruments which afford a relatively accurate indication of the smoothness of the web. Such instruments are not especially useful for providing a continuous indication of smoothness of a moving web in a production process.

Also known in the prior art are online instruments for affording a continuous measure of the smoothness of a web in a production process. While such instruments are generally satisfactory, they are not as sensitive as is desirable. More particularly, they are relatively insensitive to variations in smooth grades of paper.

SUMMARY OF THE INVENTION

One object of my invention is to provide an online smoothness sensor which is an improvement over on-line smoothness sensors of the prior art.

Another object of my invention is to provide a smoothness sensor which is more sensitive than are smoothness sensors of the prior art.

A further object of my invention is to provide a smoothness sensor which is especially sensitive to variations in smooth grades of paper.

Still another object of my invention is to provide an improved smoothness sensor which has a wide dynamic range over a variety of grades of paper such, for example, as gloss, dull and patina.

Other and further objects of my invention will appear from the following description.

BRIEF DESCRIPTION OF THE DRAWINGS

In the accompanying drawings to which reference is made in the instant specification and which are to be read in conjunction therewith and in which like reference characters are used to indicate like parts in the various views.

DESCRIPTION OF THE PREFERRED EMBODIMENT

Figure 1:
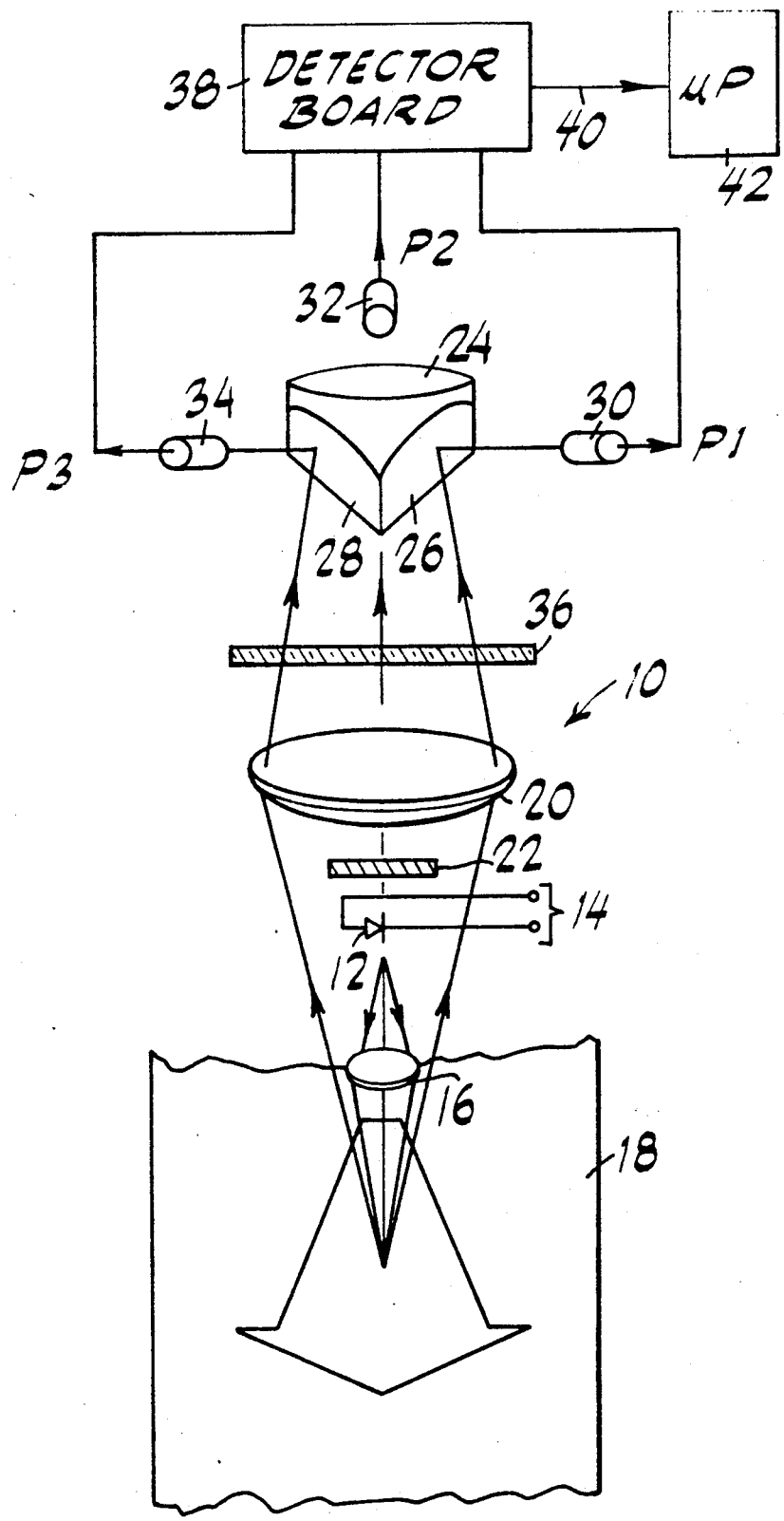
FIG. 1 is a schematic view of my improved smoothness sensor.

Referring now to FIG. 1 of the drawings, my improved smoothness sensor indicated generally by the reference character 10 includes a light source 12 which may, for example, be a 3750 millicandela LED which is square-wave driven at 100 Hz and 50% duty cycle.

A lens 16 focusses light from the source 12 onto a small spot on the web 18 which is traveling in the direction of the arrow indicated on the web.

A second lens 20 receives light from the web and directs it onto a reflecting device 24 which may, for example, be a 25 mm diameter corner-cube mirror. An opaque barrier 22 prevents light from the source 12 from traveling directly to the lens 20.

The reflecting body 24 includes three reflecting surfaces, two of which, 26 and 28, are shown in FIG. 1, for reflecting radiation to three detectors 30, 32 and 34. In response to this light, the detectors 30, 32, and 34, put out respective signals P1, P2 and P3.

Preferably we pass the return beam having a wave length of about 660 nm through a filter 36 which is a sharp cutoff anti-reflection coated long pass glass filter with transmission at 610 nm.

I feed the outputs P1, P2 and P3 to a detector board 38.

From the structure thus far described, it will be appreciated that my smoothness sensor is a contacting optical instrument with an angle of incidence generally perpendicular to the web 18. Radiation scattered from the web into each of three 120° sectors is collected by the lens 20 at angles between 9° and 15° to the normal. The reflecting surfaces of body 24 direct the radiation from the sectors to the detectors 30, 32 and 34 which convert the intensities to voltages P1, P2, and P3.

Smoothness or roughness of the web 18 is determined by measuring the RMS signal level corresponding to differences between scattered intensities in pairs of the sectors. The RMS value of the difference signal is determined via analog techniques on a single detector board 38. The incident light is modulated in the sensor head and demodulated on the electronics board to achieve immunity from ambient light levels, temperature changes and aging of the source. The three detector signal amplitudes are normalized to a common reference value by means of three automatic gain control AGC circuits. This AGC technique compensates for intial efficiency differences in the optical path, variations in the optical alignment, differences in the initial detector sensitivities, aging and temperature-related variations, and most importantly, counteracts the wide variations in signal levels found to occur with very glossy grades, and eliminates the initial set-up and periodic monitoring and adjustment of the detector board which would otherwise be required. The analog signals from the board 38 are switched onto the microprocessor bus 40, digitized and manipulated by 8085 algorithms.

Figure 2:
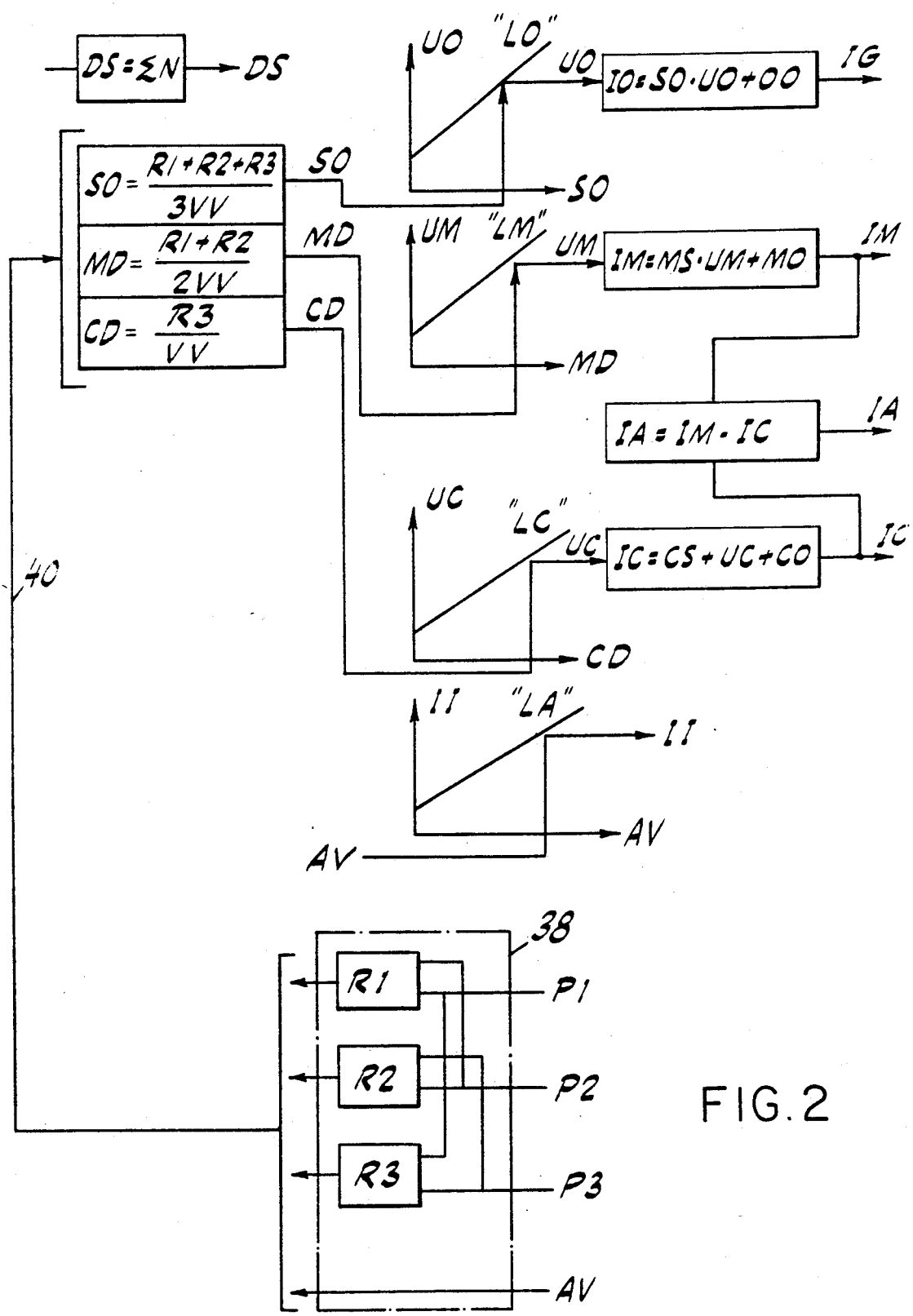
FIG. 2 is a software flow chart of the operation of my improved smoothness sensor.

Referring now to FIG. 2, the smoothness sensor detector board 38 supplies the following seven signals:

R1 which is the root mean square value of the difference between the outputs P1 and P2.

R2 which is the root mean square value of the difference between the outputs P2 and P3.

R3 which is the root mean square value of the difference between the outputs P3 and P1.

AV which is an analog input reference voltage derived from the average of all three detector outputs taken over one input integrator poll time.

DS which is the number of dirt specks, a digital output corresponding to the number of times that AV drops below a predetermined set point. DS is accumulated during a selectable time period specified by DP and output directly to the host computer as an S-message.

Using the information provided by the detector board 38, a microprocessor 42 of any suitable type known to the art, executes the following sequence illustrated diagramatically in FIG. 2. First, the cross direction (CD), machine direction (MD) and overall smoothness (SO) signals are calculated as follows:

$$SO = (R1 + R2 + R3)/(3*VV) \quad (1)$$

$$MD = (R1 + R2)/(2*VV) \quad (2)$$

$$CD = R3/VV \quad (3)$$

$$VV = AV - AO \quad (4)$$

Where AO is the average voltage offset calculated at standardization.

All three smoothness signals are correlated to the corresponding smoothness expressed in the user defined units by passing them through the three linter curves "LO", "LM" and "LC". From this conversion there are obtained the uncorrected cross direction smoothness UC, the uncorrected machine direction smoothness UM, and the uncorrected overall smoothness UO. Next, a linter correction is applied to the three uncorrected smoothness signals as:

$$IO = OS*UO + OO \quad (5)$$

$$IM = MS*UM + MO \quad (6)$$

$$IC = CS*UC + CO \quad (7)$$

Where IO is the instantaneous overall smoothness, IM is the instantaneous machine direction smoothness and IC is the instantaneous cross direction smoothness. OS, MS and CS are linear correction slopes for "IO", "IM" and "IC" respectively. OO, MO and CO are linear correction offsets for "IO", "IM" and "IC" respectively.

The instantaneous smoothness anisotropy is calculated as follows:

$$IA = IM - IC \quad (8)$$

The computer calculates a dirt speck count DS which is updated using a hardware dirt speck accumulator This accumulator is refreshed every time the detector board is read.

From the information available in the computer, a smoothness sensor profile can readily be constructed.

It will be seen that I have accomplished the objects of my invention. I have provided an improved smoothness sensor which is more sensitive than are on-line sensors of the prior art. My smoothness sensor is especially sensitive where the smoother grades of paper are being run. It has a wide dynamic range over the variety of papers being run.

It will be understood that certain features and subcombinations are of utility and may be employed without reference to other features and subcombinations. This is contemplated by and is within the scope of my claims. It is further obvious that various changes may be made in details within the scope of my claims without departing from the spirit of my invention. It is, therefore, to be understood that my invention is not to be limited to the specific details shown and described.

Having thus described my invention, what I claim is:

1. Apparatus for obtaining a precision measurement of the smoothness of a moving web of paper or the like including in combination
 a source of light,
 means for focusing light from said source onto a spot on said web along a path having an optical axis generally perpendicular to said web,
 means for collecting light reflected from said spot around substantially 360° with reference to said optical axis,
 first and second and third detectors,
 means for dividing light collected by said collecting means from respective 120° sectors around the optical axis into three discrete beams and for directing said beams respectively and individually to said first and second and third detectors to produce first and second and third output signals,
 means responsive to said output signals for producing three difference signals respectively representing the difference between the first and second output signals and the difference between the first and third output signals and the difference between the second and third output signals,
 and means responsive to said difference signals for producing said precision measurement of the smoothness of said web.

2. Apparatus as in claim 1 in which said directing means comprises a first lens disposed along said path between said light source and said web and in which said collecting means is a second lens disposed along said path between said light source and said directing means.

3. Apparatus as in claim 2 including a shield between said light source and said second lens.

4. Apparatus as in claim 3 in which said directing means is a corner-cube mirror disposed symmetrically about said optical axis at a location between said second lens and said detectors.

5. Apparatus as in claim 4 in which said difference signals are RMS signals.

6. Apparatus as in claim 5 in which said means responsive to said difference signals comprises means responsive to said RMS signals for producing measures of cross-direction smoothness, machine-direction smoothness and overall smoothness.

7. Apparatus as in claim 6 in which said collecting means collects light reflected from said surface at angles between about 9° and 15°, to said optical axis.

8. Apparatus as in claim 1 in which said difference signals are RMS signals.

9. Apparatus as in claim 8 in which said means responsive to said difference signals comprises means responsive to said RMS signals for producing measures of cross-direction smoothness, machine-direction smoothness and overall smoothness.

10. Apparatus as in claim 9 in which said collecting means collects light reflected from said surface at angles between about 9° and 15°, to said optical axis.

11. Apparatus as in claim 1 including means for modulating the light from said source, said focusing means directing said modulated light onto said spot, means for normalizing said detector output signal, means responsive to said normalized detector output signals for producing RMS signals representing the difference between pairs of said normalized detector output signals, said means responsive to said output signals being responsive to said difference signals.

* * * * *